Figure 1:
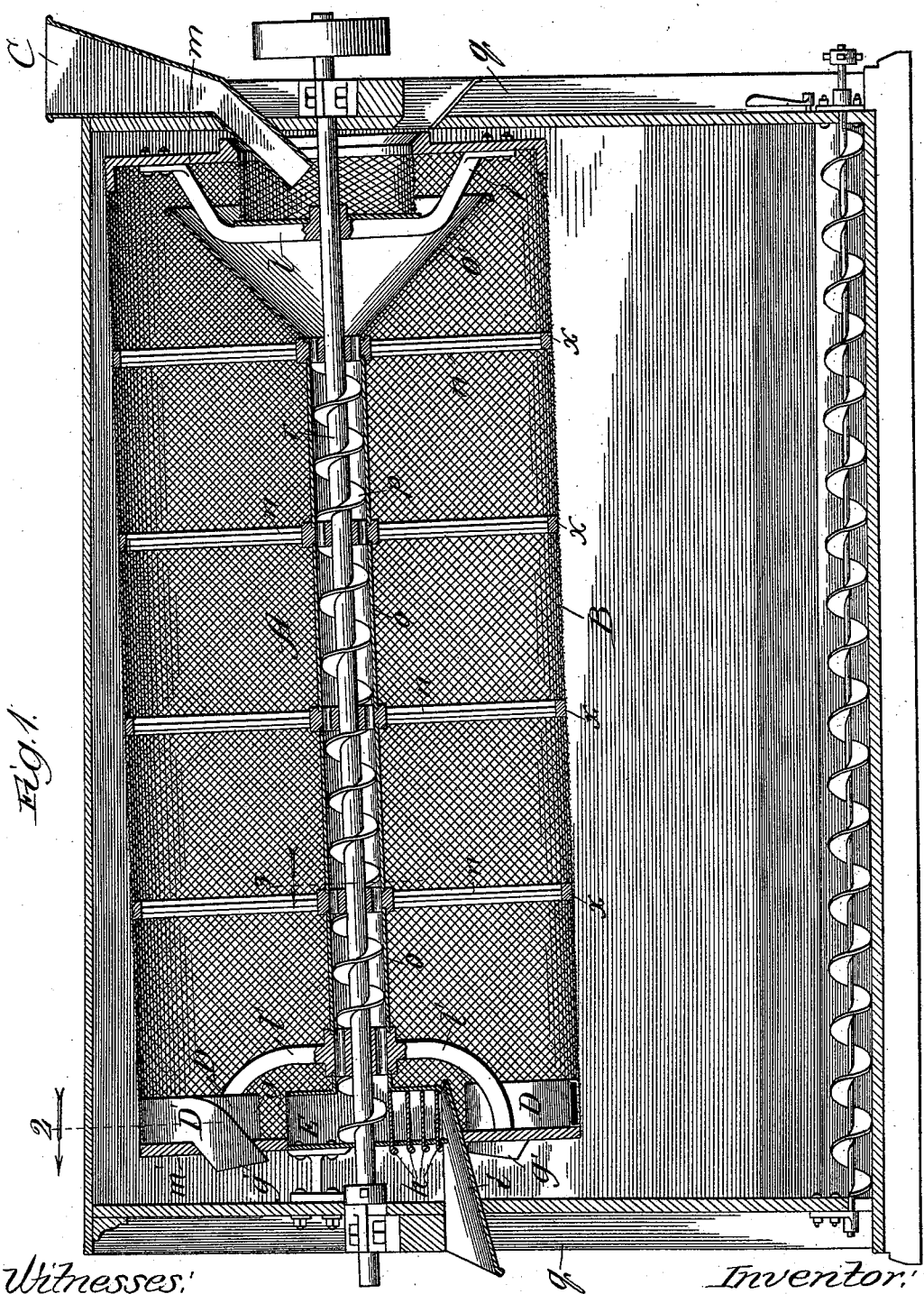

(No Model.) 2 Sheets—Sheet 1.

E. R. DRAVER.
BOLTING REEL.

No. 528,504. Patented Oct. 30, 1894.

Witnesses:
Inventor:
Emil R. Draver, (No Model.) 2 Sheets—Sheet 2.
E. R. DRAVER.
BOLTING REEL.
No. 528,504. Patented Oct. 30, 1894.
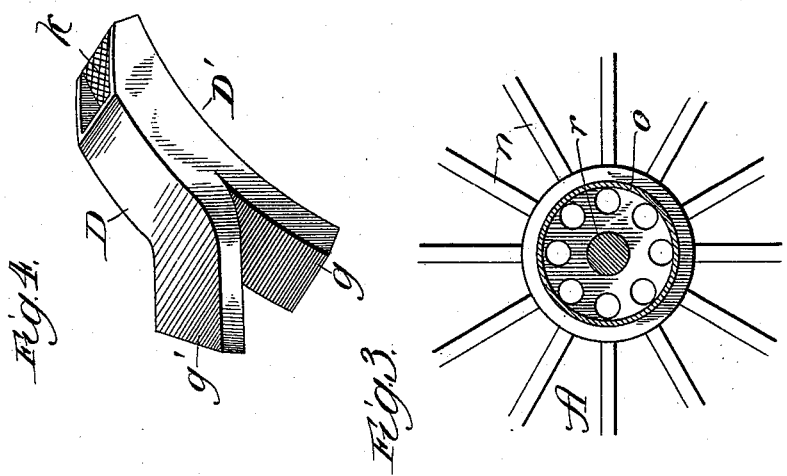
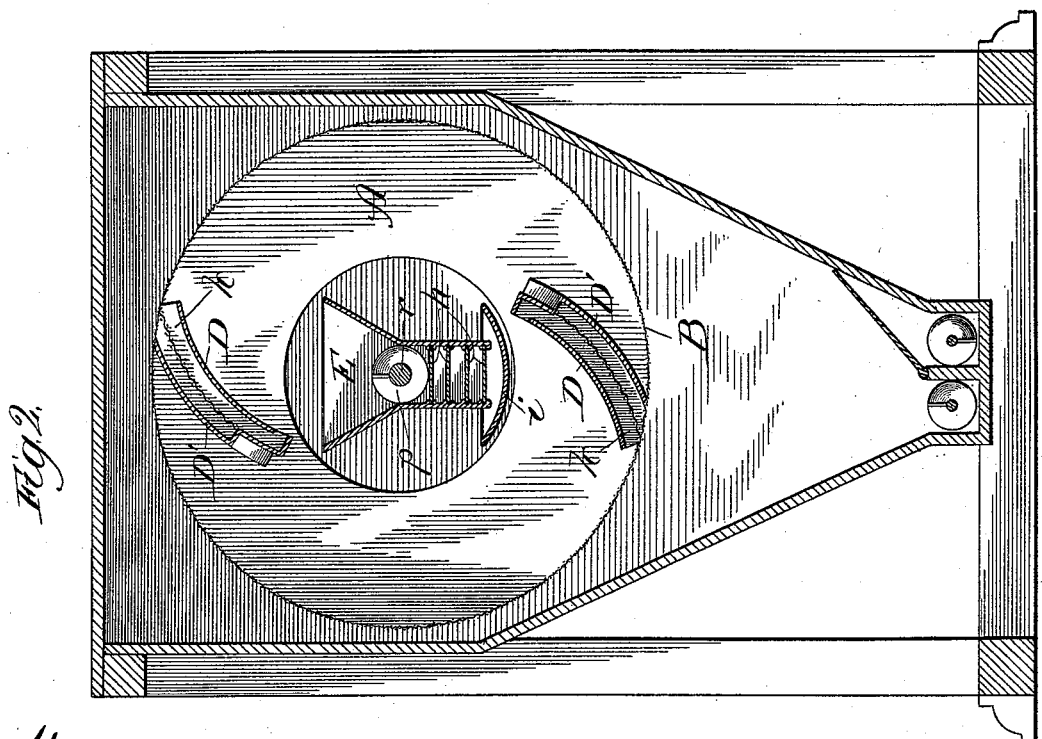
Witnesses:
Inventor:
Emil R. Draver,
By Dyrenforth & Dyrenforth,
Attys.

UNITED STATES PATENT OFFICE.

EMIL R. DRAVER, OF ALLIANCE, NEBRASKA, ASSIGNOR TO FLORENCE N. DRAVER, OF SAME PLACE.

BOLTING-REEL.

SPECIFICATION forming part of Letters Patent No. 528,504, dated October 30, 1894.

Application filed June 25, 1894. Serial No. 515,628. (No model.)

*To all whom it may concern:*

Be it known that I, EMIL R. DRAVER, a citizen of the United States, residing at Alliance, in the county of Boxbutte and State of Nebraska, have invented a new and useful Improvement in Bolting-Reels, of which the following is a specification.

My invention relates to an improvement in the class of rotary drum-like devices for sifting ground material, particularly grain, and in which the cylindrical covering of sifting-fabric (usually silk) is prevented from clogging, or its sifting function is enhanced, by the action of coarse and comparatively heavy material, such as whole grains, beans, peas, or balls, or other coarse forms of any suitable material, fed into the reel with the ground stuff.

The primary object of my invention is to provide a construction of bolting-reel whereby the coarse material, referred to, fed to the reel, may each time after having run through the apparatus from the feed end to the discharge-end thereof, be automatically returned to the feed-end again, and over and over again, to perform its function in connection with additional ground material to be bolted.

Referring to the accompanying drawings—Figure 1 is a longitudinal sectional view of a bolting-reel provided with my improvement. Fig. 2 is a section taken at the line 2 on Fig. 1 and viewed in the direction of the arrow. Fig. 3 is a broken section taken at the line 3 on Fig. 1 and viewed in the direction of the arrow; and Fig. 4 is an enlarged perspective view of a sifting-scoop detail.

A is the frame of the reel, comprising a rotary shaft $r$ journaled at opposite ends in a suitable frame $q$ and surrounded by a spiral conveyer $p$ in a sleeve $o$ around and rotating with the shaft, and from which shaft, through the sleeve, extend radially, at intervals, the arms $n$. On these arms $n$, or spokes, at their outer ends, where the members of each circumferential series are connected by a flat rim, as shown at $x$, is fastened the sifting fabric B (usually silk) extending between the heads $m$ and $m'$ to envelop the frame.

At the inlet-end of the reel there enters, through the annular head $m$, a stationary feed-hopper C; and this head is braced at its inner side from the shaft $r$ by spider-arms $l$, toward which the discharge end of the sleeve $o$ extends in the form of a bell-shaped or flaring mouth $o'$. The head $m'$, which is annular like the head $m$, is shown to be similarly braced by spider-arms $l'$; and in the annulus, at the inner side of the head $m'$ it carries two diametrically opposite, (or more, if desired) scoops D, each formed with solid sides and a screen-bottom $k$, the mesh of which is such as to permit the refuse of the ground material to pass through it into a back-chamber D' on the scoop, leading at a spout-extension $g'$ beyond the head $m'$ to discharge into a stationary chute $i$; the mesh of the scoop-bottoms being too fine for the passage through them of the coarse reel-cleaning material, which they empty, through a spout-extension $g$, into a stationary hopper E supported in the opening of the head from the frame $q$, and which opens into the adjacent end of the sleeve $o$. Below the shaft $r$ there projects an extension of the hopper E affording a rectangular pocket E' containing, at different elevations, slide-valves $h$, the uppermost of which is on a level with the wall of the sleeve $o$. By drawing out one or more of these slide-valves, from the uppermost downward, the pocket E' is deepened to intercept a portion of the coarse cleaning material, in case there be too much in the machine, at any time, for its proper working.

The operation is as follows: While the reel is revolving, there is fed to it, through the hopper C, ground stuff (grain) to be sifted, mixed, initially, with a desired proportion of coarse material, such as whole grains, peas, beans, or the like. The rotation of the reel is not rapid, so that this heavier coarse material tends to remain at a low point in the reel, which should incline somewhat, as shown, toward the head $m'$ the better to promote the progress through the apparatus of the material being treated. This coarse material facilitates the sifting action through the silk envelope B, by rubbing the fine material through it and preventing clogging thereof, or, as it were, "cleaning" the silk. As the refuse, including this coarse cleaning material, reaches or closely approaches the head $m'$ of the reel, it is taken up by the scoops D, which sift the tailings through their perforated bottoms $k$ into the chambers D' whence by the rotation of the scoops, they are discharged through the spouts $g'$ down the chute $i$; and the coarse cleaning matter is emptied by the scoops, on their attaining positions above the hopper E, into the latter, from which it enters the sleeve $o$ and is propelled by the rotating conveyer $p$ therein to the feed-end of the reel, into which it discharges at the bell-mouth $o'$, to be used over again with more ground stuff fed through the hopper C, but without requiring previous mixture with more coarse cleaning material. Thus, as will be seen, there is afforded an automatic circulation of the coarse cleaning matter, whereby it may be used over and over again without first requiring it to be discharged from the machine and divided from the refuse by a separate operation.

I believe that it is quite novel with me to provide a bolting-reel with any automatic conveying means for returning the coarse cleaning material to the feed-end of the reel; and I therefore desire to be understood as claiming this broadly as my invention.

What I claim as new, and desire to secure by Letters Patent, is—

1. In combination with a bolting-reel, an automatic conveyer on the reel operating to return the coarse cleaning material from near the discharge-end into the feed-end of the apparatus, substantially as described.

2. In a bolting-reel, the combination with its shaft of a conveyer discharging near the feed-end of the reel and having its feed-end near the discharge-end of the reel, and a rotary sifting scoop discharging into the feed-end of the conveyer and provided with a receiving and discharging outlet for the material sifted from the scoop, substantially as described.

3. In a bolting-reel, the combination with its shaft of a spiral-conveyer discharging near the feed-end of the reel and having its feed-end near the discharge-end of the reel, a hopper leading into the feed-end of the conveyer, and a rotary sifting scoop discharging into said hopper and provided with a receiving and discharging chamber for the material sifted from the scoop, substantially as described.

4. In a bolting-reel, the combination with its shaft of a spiral conveyer discharging near the feed-end of the reel and having its feed-end near the discharge-end of the reel, a hopper leading into the feed-end of the conveyer and having a pocket-extension, and a rotary sifting scoop discharging into said hopper and provided with a receiving and discharging chamber for the material sifted from the scoop, substantially as described.

5. In a bolting-reel, the combination with its shaft of a spiral conveyer discharging near the feed-end of the reel and having its feed-end near the discharge-end of the reel, a hopper leading into the feed-end of the conveyer and having a pocket-extension provided with slide-valves, and a rotary sifting scoop discharging into said hopper and provided with a receiving and discharging chamber for the material sifted from the scoop, substantially as described.

6. In a bolting-reel, the combination with the shaft, of a spiral conveyer thereon surrounded by a sleeve having its feed-end near the discharge-end of the reel and its discharge-end near the feed-end of the reel, an annular head $m'$ on the reel carrying scoops D, each formed with a screen-bottom $k$ and a rear-chamber D′ discharging beyond said head, and a stationary hopper E supported in position to receive the discharges from the said scoops, the whole being constructed and arranged to operate substantially as described.

EMIL R. DRAVER.

In presence of—
 CHARLES F. CARLETON,
 H. C. DRAVER.